(12) United States Patent
Tang et al.

(10) Patent No.: US 11,889,127 B2
(45) Date of Patent: Jan. 30, 2024

(54) LIVE VIDEO INTERACTION METHOD AND APPARATUS, AND COMPUTER DEVICE

(71) Applicant: SHANGHAI HODE INFORMATION TECHNOLOGY CO., LTD., Shanghai (CN)

(72) Inventors: Zixin Tang, Shanghai (CN); Dewei Xue, Shanghai (CN)

(73) Assignee: SHANGHAI HODE INFORMATION TECHNOLOGY CO., LTD., Shanghai (CN)

(*) Notice: Subject to any disclaimer, the term of this patent is extended or adjusted under 35 U.S.C. 154(b) by 42 days.

(21) Appl. No.: 17/783,622

(22) PCT Filed: Aug. 18, 2020

(86) PCT No.: PCT/CN2020/109870
§ 371 (c)(1),
(2) Date: Jun. 8, 2022

(87) PCT Pub. No.: WO2021/114709
PCT Pub. Date: Jun. 17, 2021

(65) Prior Publication Data
US 2023/0009336 A1    Jan. 12, 2023

(30) Foreign Application Priority Data
Dec. 9, 2019  (CN) .......................... 201911252366.7

(51) Int. Cl.
*H04N 21/2187*   (2011.01)
*G10L 15/22*    (2006.01)
*H04N 21/4788*   (2011.01)

(52) U.S. Cl.
CPC ......... *H04N 21/2187* (2013.01); *G10L 15/22* (2013.01); *H04N 21/4788* (2013.01); *G10L 2015/223* (2013.01)

(58) Field of Classification Search
CPC . H04N 21/2187; H04N 21/4788; G10L 15/22
See application file for complete search history.

(56) References Cited

U.S. PATENT DOCUMENTS

| 2001/0014210 A1 | 8/2001 | Kang |
| 2017/0085960 A1 | 3/2017 | Ye et al. |

FOREIGN PATENT DOCUMENTS

| CN | 106303658 A | 1/2017 |
| CN | 106303732 A | 1/2017 |

(Continued)

OTHER PUBLICATIONS

International Patent Application No. PCT/CN2020/109870; Int'l Search Report; dated Nov. 25, 2020; 3 pages.

*Primary Examiner* — Nicholas T Corbo
(74) *Attorney, Agent, or Firm* — BakerHostetler (57) ABSTRACT

The present application discloses techniques for interaction during live video streaming. The techniques comprise obtaining and playing streamer-end video data, and user-end video data captured by a user terminal in real time; monitoring and recognizing whether the streamer-end video data comprise a preset voice instruction; determining whether the user-end video data comprises a target audio or a target video when the streamer-end video data comprises the preset voice instruction; and displaying a video special effect corresponding to the preset voice instruction in a user video when the user-end video data comprise the target audio or the target video. By means of the present application, a video special effect can be played for a user video according to a result of interaction between a streamer and a user, which enriches the way of interaction presentation and enhances the sense of participation in interaction.

19 Claims, 6 Drawing Sheets

(56) References Cited

FOREIGN PATENT DOCUMENTS

| | | | |
|---|---|---|---|
| CN | 106791921 | A | 5/2017 |
| CN | 107509117 | A | 12/2017 |
| CN | 108076392 | A | 5/2018 |
| CN | 108462883 | A | 8/2018 |
| CN | 108616761 | A | 10/2018 |
| CN | 109429075 | A | 3/2019 |
| CN | 110493610 | A | 11/2019 |

Fig. 11 ional Application No. PCT/CN2020/109870, filed on Aug. 18, 2020, which claims the priority to Chinese Patent Application No. 201911252366.7, filed with the China National Intellectual Property Administration on Dec. 9, 2019, and entitled "Interaction Method and apparatus for live video, and computer device", both of which are incorporated herein by reference in their entireties.

TECHNICAL FIELD

The present application relates to the field of multimedia technologies, and in particular to an interaction method for live video, an apparatus, a computer device, and a computer-readable storage medium.

BACKGROUND ART

With the rapid development of Internet technologies, live video, which is visual, fast, and highly interactive, has become an extremely extensive way of entertainment and is popular among people. During live video, a viewing user may generally interact with a liver streamer by means of gift giving, like giving, and cheering for the streamer. Gift is an important component of live streaming content. Moreover, the consumption behavior of paying for a gift can have a positive incentive effect on the live streaming content, and various ways of presenting gift can more effectively promote the production of high-quality live content. The streamer may take part in interactive entertainment by means of questioning and answering, or giving an invitation to the viewing user, such as making some expressions and actions together with the viewing user.

The inventor has appreciated that during the interaction between the viewing user and the streamer, only the streamer screen is displayed in real time in a public screen region for chatting or a fixed position in a live streaming screen, which results in a simple mode of presentation and cannot reflect the interactive state of the viewing user himself/herself. Therefore, this brings a poor experience to viewing users, and cannot meet the diverse entertainment requirements of users.

SUMMARY OF THE INVENTION

The present application provides an interaction method and apparatus for live video, a computer device, and a computer-readable storage medium, which are used to solve the problem of a simple mode of presentation and thus a limited sense of participation in interaction when a user interacts with a streamer during live streaming.

First, in order to achieve the above object, the present application provides an interaction method for live video, the method including:

obtaining streamer-end video data, and user-end video data which is captured in real time by a user terminal, and displaying the streamer-end video data and the user-end video data as a streamer video and a user video respectively; monitoring and recognizing whether the streamer-end video data comprises a preset voice instruction; capturing a video data segment within a preset time range from the user-end video data when the streamer-end video data comprises the voice instruction; determining whether the video data segment comprises a target audio and/or a target video, where the target audio and the target video have an association relationship with the voice instruction; and displaying a video special effect corresponding to the voice instruction in the user video when the video data segment comprises the target audio and/or the target video.

In an example, the monitoring and recognizing whether the streamer-end video data comprises a preset voice instruction includes: dividing audio data in the streamer-end video data into audio data units by means of translational capturing; sequentially recognizing each of the audio data units to obtain first voice text, and comparing the first voice text with a preset voice instruction text library; and determining, when the first voice text comprises a first voice instruction in the voice instruction text library, that the streamer-end video data comprises the first voice instruction.

In an example, the determining whether the video data segment comprises target audio includes: performing voice recognition on audio data in the video data segment to obtain second voice text; comparing the second voice text with the first voice text; and determining that the video data segment comprises the target audio when a similarity between the second voice text and the first voice text is higher than a first threshold.

In an example, the determining whether the video data segment comprises a target video includes: performing image recognition on video data in the video data segment to obtain a recognition result; comparing the recognition result with video recognition data corresponding to the first voice text in a preset voice instruction association list; and determining that the video data segment comprises the target video when a similarity between the recognition result and the video recognition data is higher than a second threshold.

In an example, the method further includes: counting a duration of the target audio and/or the target video; and selecting, according to the duration, a corresponding display level for display of the video with the special effect, where the display level comprises at least one of a display duration and a display pattern.

In an example, the method further includes: displaying a name corresponding to the voice instruction in the user video while displaying the video special effect corresponding to the voice instruction in the user video.

In an example, when the voice instruction is giving a gift, while displaying the video special effect corresponding to the voice instruction in the user video, reducing currency in an account of a user by value of the gift.

In addition, in order to achieve the above object, the present application further provides an interaction apparatus for live video, the apparatus including:

an obtaining module configured to obtain streamer-end video data, and user-end video data which is captured in real time by a user terminal, and display the streamer-end video data and the user-end video data as a streamer video and a user video respectively; a monitoring module configured to monitor and recognize whether the streamer-end video data comprises a preset voice instruction; a capturing module configured to capture a video data segment within a preset time range from the user-end video data when the streamer-end video data comprises the voice instruction; a recognition module configured to determine whether the video data segment comprises a target audio and/or a target video, where the target audio and the target video have an association relationship with the voice instruction; and a display module configured to display a video special effect corresponding to the voice instruction in the user video when the video data segment comprises the target audio and/or the target video.

Further, the present application further provides a computer device, which includes a memory and a processor, where the memory stores computer-readable instructions operable on the processor, and wherein the computer-readable instructions, upon being executed by the processor, cause the processor to implement the following steps:

obtaining streamer-end video data, and user-end video data which is captured in real time by a user terminal, and displaying the streamer-end video data and the user-end video data as a streamer video and a user video respectively; monitoring and recognizing whether the streamer-end video data comprises a preset voice instruction; capturing a video data segment within a preset time range from the user-end video data when the streamer-end video data comprises the voice instruction; determining whether the video data segment comprises a target audio and/or a target video, where the target audio and the target video have an association relationship with the voice instruction; and displaying a video special effect corresponding to the voice instruction in the user video when the video data segment comprises the target audio and/or the target video.

Further, in order to achieve the above object, the present application further provides a computer-readable storage medium storing computer-readable instructions, where the computer-readable instructions being executed by at least one processor to cause the at least one processor to perform the following steps:

obtaining streamer-end video data, and user-end video data which is captured in real time by a user terminal, and displaying the streamer-end video data and the user-end video data as a streamer video and a user video respectively; monitoring and recognizing whether the streamer-end video data comprises a preset voice instruction; capturing a video data segment within a preset time range from the user-end video data when the streamer-end video data comprises the voice instruction; determining whether the video data segment comprises a target audio and/or a target video, where the target audio and the target video have an association relationship with the voice instruction; and displaying a video special effect corresponding to the voice instruction in the user video when the video data segment comprises the target audio and/or the target video.

In the interaction method and apparatus for live video, the computer device, and the computer-readable storage medium provided in present application, streamer-end video data, and user-end video data which is captured in real time by a user terminal can be obtained and respectively displayed as a streamer video and a user video; then it can be monitored and recognized whether the streamer-end video data comprises a preset voice instruction; when the streamer-end video data comprises the voice instruction, a video data segment within a preset time range can be captured from the user-end video data, and it can be determined whether the video data segment comprises a target audio and/or a target video; and a video special effect corresponding to the voice instruction can be displayed in the user video when the video data segment comprises the target audio and/or the target video. By means of the above method, a video special effect can be played for a user video according to a result of interaction in voices and/or actions between a streamer and a user, which enriches the way of interaction presentation and enhances the sense of participation in interaction.

DETAILED DESCRIPTION OF EMBODIMENTS

In order to make the objectives, technical solutions, and advantages of the present application clearer, the present application will be described in further detail below in conjunction with the accompanying drawings and embodiments. It should be understood that the specific embodiments described here are merely intended to explain the present application, but are not intended to limit the present application. All other embodiments obtained by those of ordinary skill in the art based on the embodiments of the present application without creative efforts shall fall within the scope of protection of the present application.

It should be noted that the descriptions related to "first", "second", etc. in the present application are merely used for the illustrative purpose, and should not be construed as indicating or implying the relative importance thereof or implicitly indicating the number of technical features indicated. Thus, features defined with "first" and "second" may explicitly or implicitly comprise at least one of the features. Additionally, technical solutions among various embodiments can be combined with each other, but they must be based on the realization by those of ordinary skill in the art. When a combination of technical solutions is contradictory or cannot be realized, it should be considered that such a combination of the technical solutions does not exist, and also does not fall within the scope of protection of the present application claimed.

Figure 1:
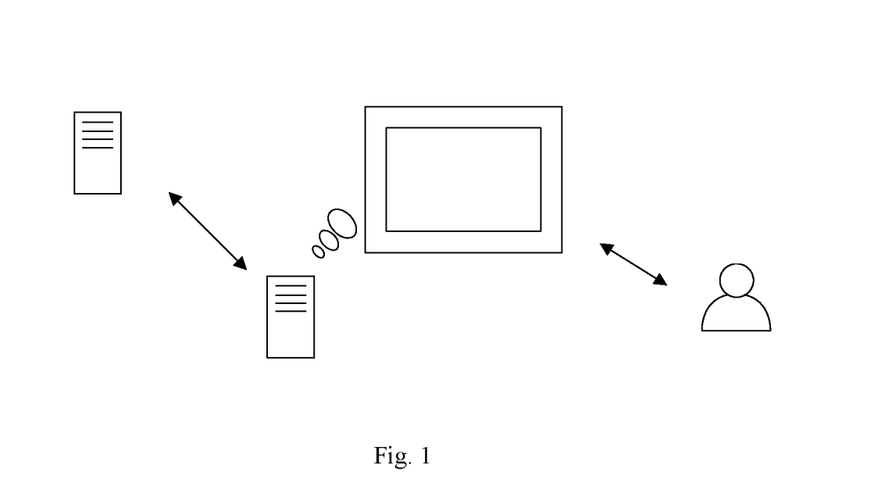
FIG. 1 is a scenario diagram of an optional application environment according to an embodiment of the present application.

FIG. 1 is a schematic diagram of an application environment according to an embodiment of the present application. Referring to FIG. 1, a computer device 1 is connected to a live streamer terminal 2, and may receive and obtain streamer video data sent by the live streamer terminal 2. In this embodiment, the computer device 1 is used as a user terminal, and may be an independent electronic device having a camera function, such as a mobile phone, a portable device, and a PC. The computer device may alternatively be an independent functional module that is attached to a main electronic device having a camera function and then helps the main electronic device to implement the function of interaction during live video.

Figure 2:
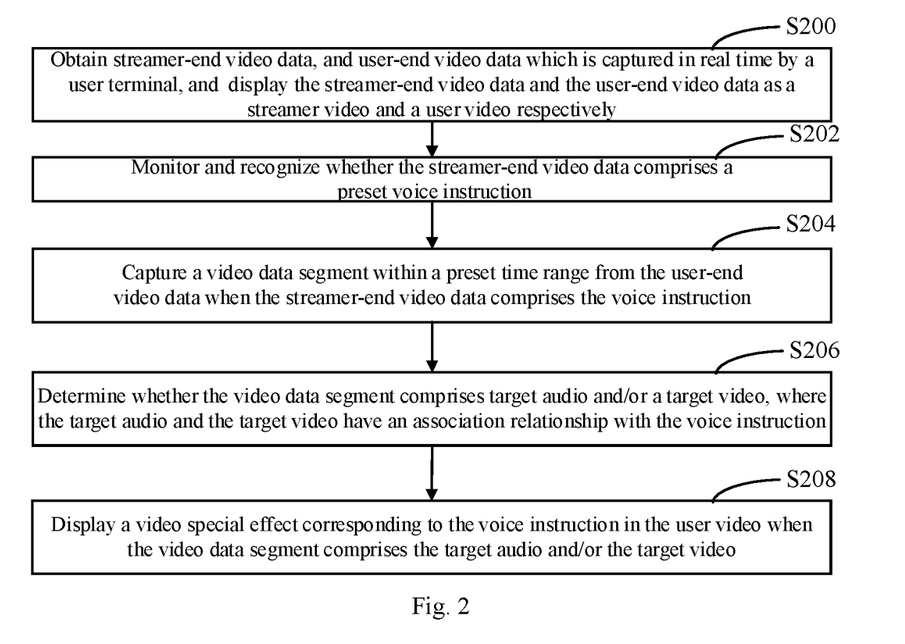
FIG. 2 is a schematic flowchart of an embodiment of an interaction method for live video according to the present application.

FIG. 2 is a schematic flowchart of an embodiment of an interaction method for live video according to the present application. It can be understood that the flowchart in this method embodiment is not used to limit the order of execution of the steps. An exemplary description is made below by taking a computer device as an execution subject.

As shown in FIG. 2, the method for interaction during live video streaming may include steps S200 to S208.

In step S200, streamer-end video data, and user-end video data which is captured in real time by a user terminal are obtained and respectively displayed as a streamer video and a user video.

Specifically, the computer device 1 is connected to the streamer terminal 2 through a network, and then may obtain a streamer video sent by the streamer terminal 2. The streamer video is video data captured by the streamer using the streamer terminal 2 during live streaming. Certainly, as a terminal device of a viewing user, the computer device 1 is provided with a camera unit which can capture a user video of the viewing user. That is to say, the computer device 1 can obtain the streamer-end video data and the user-end video data, and then display the streamer-end video data and the user-end video data as the streamer video and the user video in a display interface on the computer device 1. In this embodiment, the streamer video and the user video are displayed in one video playback window in a seamless stitching manner and are thus played in a stitching manner, such that the videos of a viewing user and a streamer can be displayed in the same window. As such, the viewing user may feel a sense of being close to the streamer. In other embodiments, the streamer video and the user video may also be displayed separately, which is not limited here.

In step S202, monitoring and recognizing whether the streamer-end video data comprises a preset voice instruction.

Specifically, after displaying the user-end video data and the streamer-end video data in the video playback window, the computer device 1 may further monitor and recognize whether the streamer video data comprises the preset voice instruction.

Figure 3:
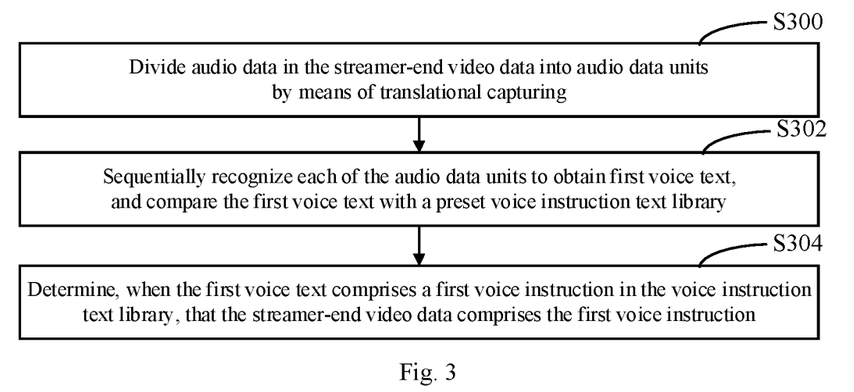
FIG. 3 is a schematic flowchart of an exemplary embodiment of step S202 in FIG. 2.

Referring to FIG. 3, in an exemplary embodiment, step S202 may include steps S300 to S304.

In step S300, audio data in the streamer-end video data is divided into audio data units by means of translational capturing.

In step S302, each of the audio data units is sequentially recognized to obtain first voice text, and the first voice text is compared with a preset voice instruction text library.

In step S304, when the first voice text comprises a first voice instruction in the voice instruction text library, it is determined that the streamer-end video data comprises the first voice instruction.

Specifically, the computer device 1 first separates the audio data from the streamer-end video data and then divides the audio data into the audio data units by means of translational capturing according to a timeline. In this embodiment, the translational capturing is sequentially performing division to obtain the audio data segments by time periods, which are used as the smallest unit of voice recognition. Next, the computer device sequentially recognizes each of the audio data units to obtain first voice text, and compares the first voice text with a preset voice instruction text library. The voice instruction text library is preset by the computer device 1 and comprises all voice text corresponding to voice instructions that can trigger video special effects. Therefore, the computer device 1 compares the first voice text with the voice instruction text library, and when the first voice text comprises a first voice instruction (any valid voice instruction) in the voice instruction text library, the computer device determines that the streamer-end video data comprises the first voice instruction.

In step S204, a video data segment within a preset time range is captured from the user-end video data when the streamer-end video data comprises the voice instruction.

In step S206, it is determined whether the video data segment comprises target audio and/or a target video, where the target audio and the target video have an association relationship with the voice instruction.

Specifically, when determining that the streamer-end video data comprises the voice instruction, the computer device 1 finds video data of a corresponding time portion of the user-end video data according to the time point of the streamer-end video data, and then captures the video data segment within the preset time range. In this embodiment, the time range is a preset time period starting from a time point of the streamer-end video data including the voice instruction. In other words, a user returns a feedback after responding to the voice instruction, and then a user end obtains video data of the feedback. Next, the computer device 1 recognizes the video data segment, and determines whether the video data segment comprises target audio and/or a target video. The target audio and the target video have an association relationship with the voice instruction, and the association relationship is a correlation or a causal relationship. For example, if the voice instruction is "Please cheer for a streamer", the target audio is a shout for cheering for a streamer, or a body movement or facial expression made for cheering for a streamer.

Figure 4:
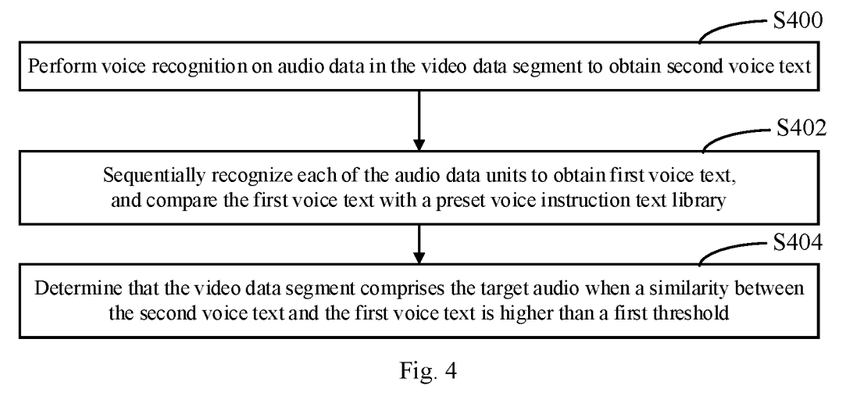
FIG. 4 is an exemplary flowchart of step S206 of the determining whether the video data segment comprises target audio in FIG. 2.

Referring to FIG. 4, in an exemplary embodiment, the process of step S206 of the determining whether the video data segment comprises target audio may include steps S400 to S404.

In step S400, voice recognition is performed on audio data in the video data segment to obtain second voice text.

In step S402, the second voice text is compared with the first voice text.

In step S404, it is determined that the video data segment comprises the target audio when a similarity between the second voice text and the first voice text is higher than a first threshold.

For example, if finding, through comparison, that the similarity between the second voice text and the first voice text is above 95%, the computer device 1 determines that the video data segment comprises the target audio.

Figure 5:
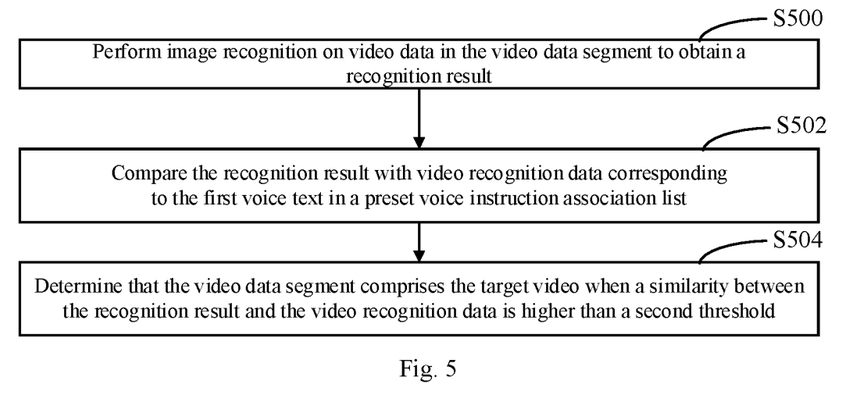
FIG. 5 is an exemplary flowchart of the process of step S206 of the determining whether the video data segment comprises a target video in FIG. 2.

Referring to FIG. 5, in an exemplary embodiment, the process of step S206 of the determining whether the video data segment comprises a target video may include steps S500 to S504.

In step S500, image recognition is performed on video data in the video data segment to obtain a recognition result.

In step S502, the recognition result is compared with video recognition data corresponding to the first voice text in a preset voice instruction association list.

In step S504, it is determined that the video data segment comprises the target video when a similarity between the recognition result and the video recognition data is higher than a second threshold.

In this embodiment, the computer device 1 is also provided with a voice instruction association list, which includes each voice instruction and a description of a body movement or facial expression having an association relationship with the voice instruction. Therefore, after performing image recognition on the video data in the video data segment, the computer device 1 obtains the recognition result that indicates exactly a description of a body movement or facial expression having an association relationship with the voice instruction, or a similarity higher than 90%. In this case, the computer device 1 determines that the video data segment comprises the target video.

In step S208, a video special effect corresponding to the voice instruction is displayed in the user video when the video data segment comprises the target audio and/or the target video.

Figure 6:
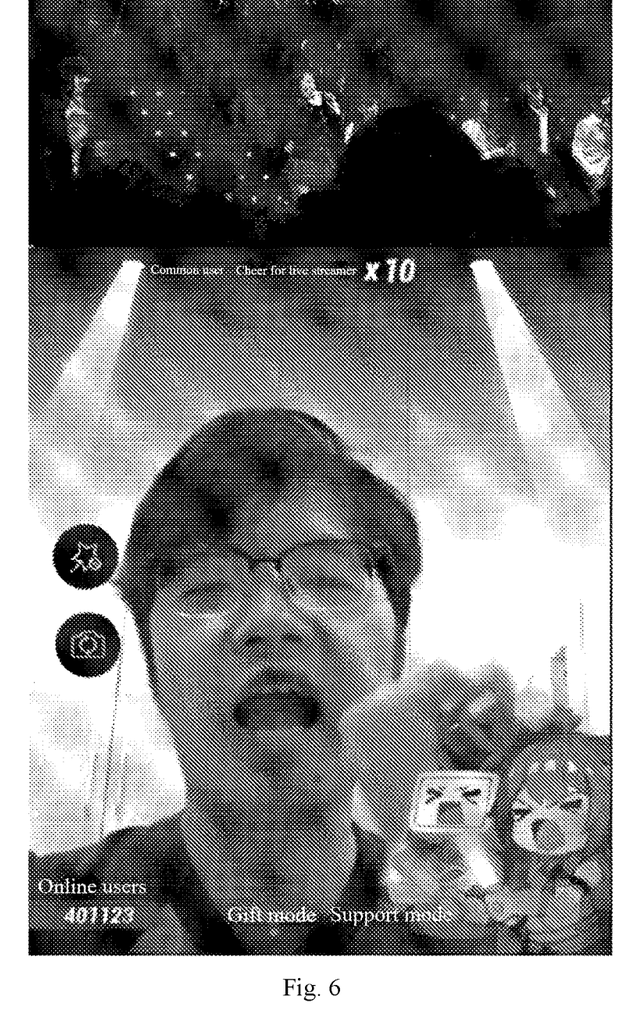
FIG. 6 is a diagram showing the effect of an exemplary video special effect for a streamer video interaction.
Figure 7:
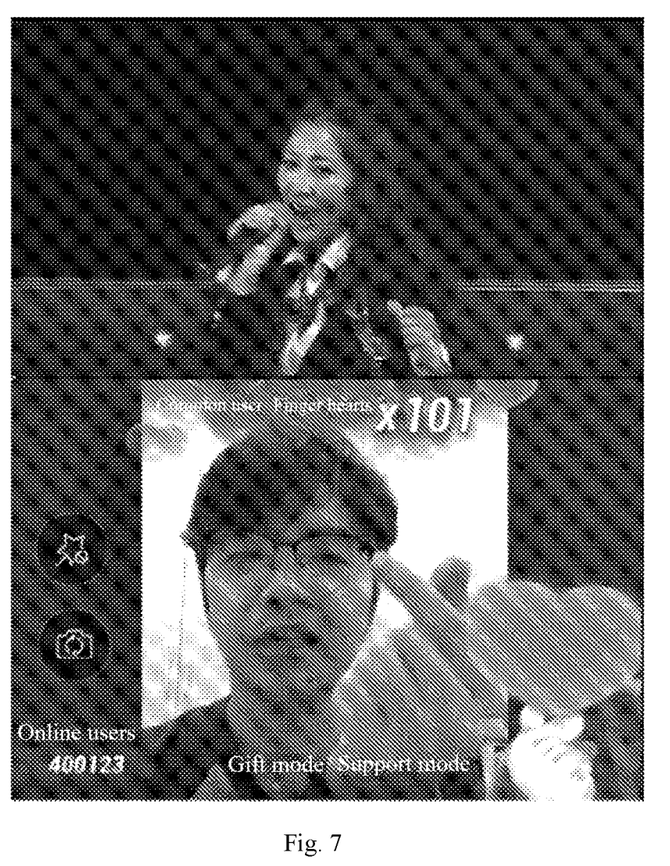
FIG. 7 is a diagram showing the effect of another exemplary video special effect for a streamer video interaction.

Specifically, when determining that the user video data segment comprises the target audio and/or the target video, the computer device 1 searches for a video special effect corresponding to the voice instruction according to the voice instruction, and then displays the video special effect in the user video. Referring to FIG. 6, it is a diagram showing the effect of an exemplary video special effect, in which if the voice instruction is "cheering for a streamer", a corresponding video special effect related to cheering for a streamer is displayed in the user video, such as displaying the special effect of a cartoon character cheering for a streamer, and highlighting and colorfully displaying the scenario of cheering for a streamer. Further referring to FIG. 7, it is a diagram showing the effect of an exemplary video special effect, in which if the voice instruction is "making a finger heart", a corresponding video special effect related to the finger heart is displayed in the user video, such as displaying the effect of red hearts rising.

Figure 8:
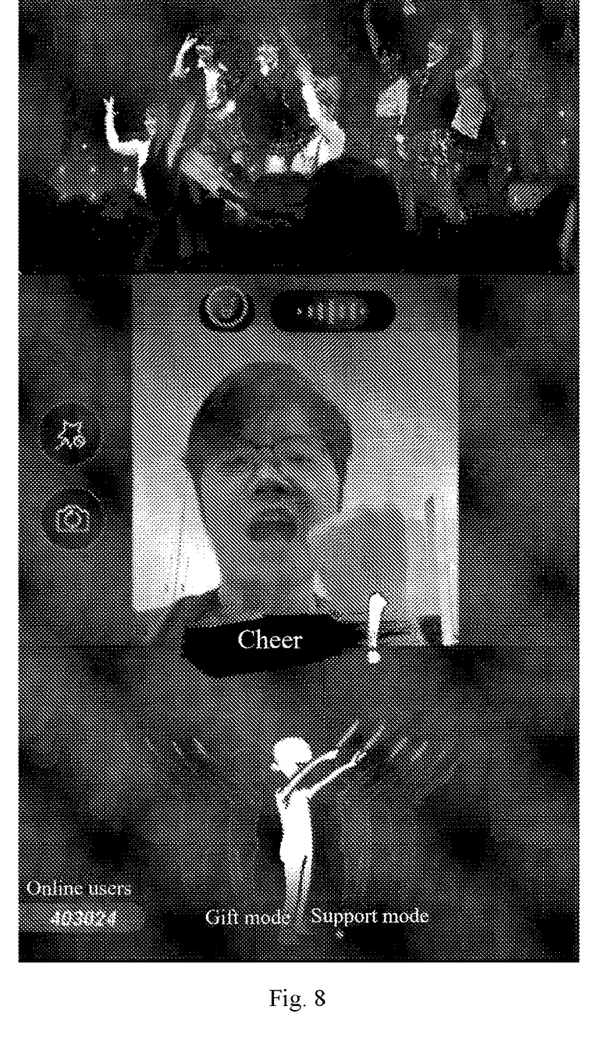
FIG. 8 is a diagram showing the effect of yet another exemplary video special effect for a streamer video interaction.

Additionally, the computer device 1 also displays a name corresponding to the voice instruction in the user video while displaying the video special effect corresponding to the voice instruction in the user video. As shown in FIG. 8, the voice instruction is "cheering for a streamer", and the video special effect not only shows the effect of a cartoon character cheering for the streamer, but also shows the specific type of cheering for the streamer, namely "Cheer (which means cheering for a streamer by moving a glow stick at a certain rhythm)!". Of course, in other embodiments, when the voice instruction is giving a gift, currency in an account of a user is reduced by value of the gift while the video special effect corresponding to the voice instruction is displayed in the user video.

Figure 9:
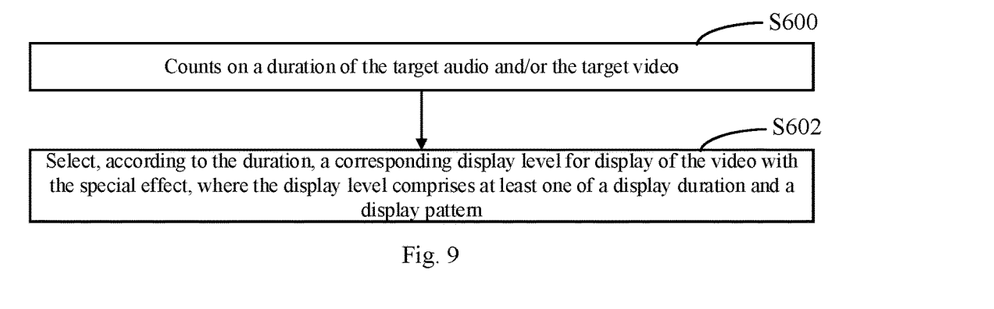
FIG. 9 is a schematic flowchart of an exemplary embodiment based on FIG. 2.

Referring to FIG. 9, in an exemplary embodiment, the method for interaction during live video streaming may further include steps S600 to S602, in addition to steps S200 to S208.

In step S600, counts a duration of the target audio and/or the target video.

In step S602, a corresponding display level is selected according to the duration for display of the video with the special effect, where the display level comprises at least one of a display duration and a display pattern.

Specifically, when the video data segment comprises the target audio and/or the target video, the computer device 1 displays the video special effect corresponding to the voice instruction in the user video and then also counts the duration of the target audio and/or the target video, and selects, according to the duration, the corresponding display level for display of the video with the special effect. For example, when cheering for a streamer is made, the number of instances of cheering for a streamer, or the level of cheering for a streamer is displayed, or the effect of cheering for a streamer is displayed in a brighter color.

It can be learned from above that by means of the method for interaction during live video streaming provided in this embodiment, streamer-end video data, and user-end video data which is captured by a user terminal in real time can be obtained and respectively displayed as a streamer video and a user video; then it can be monitored and recognized whether the streamer-end video data comprises a preset voice instruction; when the streamer-end video data comprises the voice instruction, a video data segment within a preset time range can be captured from the user-end video data, and it can be determined whether the video data segment comprises target audio and/or a target video; and a video special effect corresponding to the voice instruction can be displayed in the user video when the video data segment comprises the target audio and/or the target video. By means of the above method, a video special effect can be played for a user video according to a result of interaction in voices and/or actions between a streamer and a user, which enriches the way of interaction presentation and enhances the sense of participation in interaction.

Figure 10:
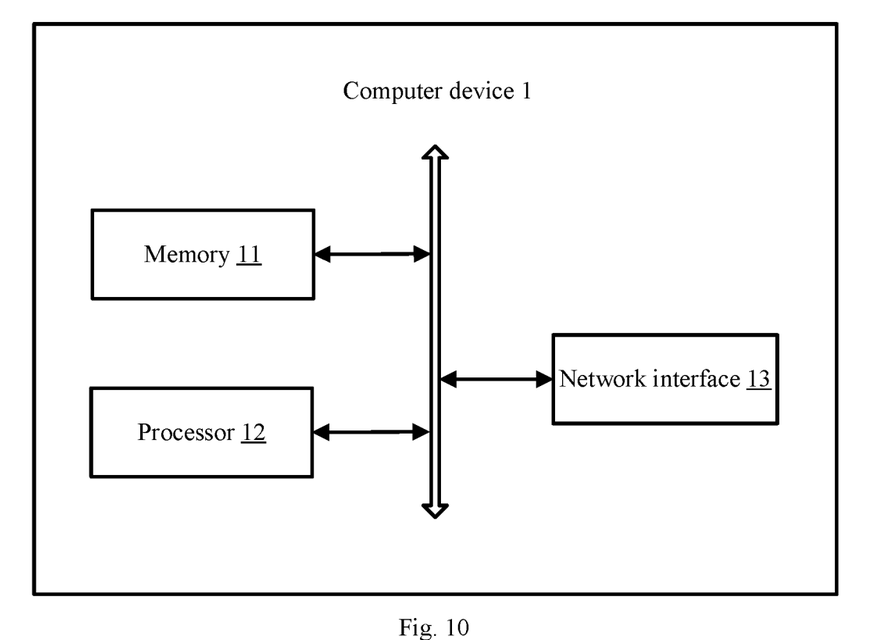
FIG. 10 is a schematic diagram of an optional hardware architecture of a computer device according to the present application.

In addition, the present application further provides a computer device. FIG. 10 is a schematic diagram of an optional hardware architecture of a computer device according to the present application.

In this embodiment, the computer device 1 may include, but is not limited to, a memory 11, a processor 12, and a network interface 13 that can be communicatively connected to each other via a system bus. The computer device 1 is connected to a network (not shown in FIG. 10) through the network interface 13, and is connected to a streamer terminal, etc. (not shown in FIG. 10) through the network to perform data exchange. The network may be a wireless or wired network such as Intranet, Internet, a global system of mobile communication (GSM), wideband code division multiple access (WCDMA), a 4G network, a 5G network, Bluetooth, Wi-Fi, or a telephone network.

It should be noted that FIG. 10 shows only the computer device 1 having components 11 to 13, but it should be understood that not all of the illustrated components are required to be implemented, and more or fewer components may be implemented instead.

The memory 11 includes at least one type of readable storage medium, and the readable storage medium includes a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the memory 11 may be an internal storage unit of the computer device 1, such as a hard disk or a memory of the computer device 1. In some other embodiments, the memory 11 may also be an external storage device of the computer device 1, such as a plug-in hard disk disposed on the computer device 1, a smart media card (SMC), a secure digital (SD) card, or a flash card. Certainly, the memory 11 may also include both the internal storage unit of the computer device 1 and the external storage device thereof. In this embodiment, the memory 11 is generally used to store an operating system and various types of application software installed in the computer device 1, such as program code of a baffle application and program code of an interaction apparatus 200 for live video. In addition, the memory 11 may be further used to temporarily store various types of data that has been output or will be output.

The processor 12 may be, in some embodiments, a central processing unit (CPU), a controller, a microcontroller, a microprocessor, or other data processing chips. The processor 12 is generally used to control the overall operation of the computer device 1, for example, performing data exchange or communication-related control and processing, etc. In this embodiment, the processor 12 is used to run program code stored in the memory 11 or process data, for example, to run an application of the interaction apparatus 200 for live video, but it is not limited here.

The network interface 13 may include a wireless network interface or a wired network interface. The network interface 13 is generally used to establish a communication connection between the computer device 1 and a streamer terminal.

In this embodiment, the interaction apparatus 200 for live video is installed and run in the computer device 1. When the interaction apparatus 200 for live video is run, the computer device can obtain streamer-end video data, and user-end video data which is captured by a user terminal in real time, and respectively display the streamer-end video data and the user-end video data as a streamer video and a user video; then the computer device can monitor and recognize whether the streamer-end video data comprises a preset voice instruction; when the streamer-end video data comprises the voice instruction, the computer device can capture a video data segment within a preset time range from the user-end video data, and determine whether the video data segment comprises target audio and/or a target video; and the computer device can display a video special effect corresponding to the voice instruction in the user video when the video data segment comprises the target audio and/or the target video. By means of the above method, a video special effect can be played for a user video according to a result of interaction in voices and/or actions between a streamer and a user, which enriches the way of interaction presentation and enhances the sense of participation in interaction.

Heretofore, the hardware structure and functions of the computer device of the present application have been described in detail. Embodiments of the present application are provided below based on the computer device described above.

Figure 11:
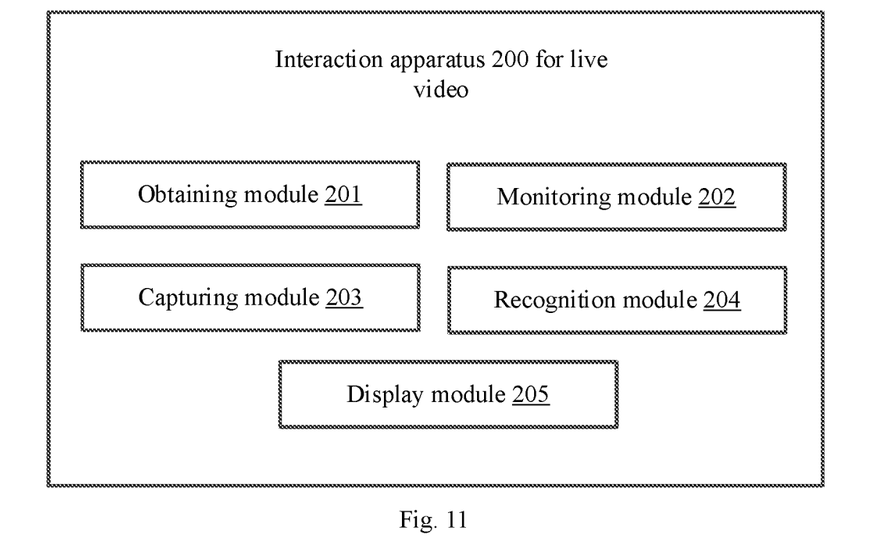
FIG. 11 is a schematic diagram of program modules in an embodiment of an interaction apparatus for live video according to the present application.

FIG. 11 is a diagram of program modules in an embodiment of an apparatus 200 for interaction during live video streaming according to the present application.

In this embodiment, the interaction apparatus 200 for live video comprises a series of computer-readable instructions stored in the memory 11, and upon the computer-readable instructions being executed by the processor 12, an interactive function during live video streaming in this embodiment of the present application can be implemented. In some embodiments, the apparatus 200 for interaction during live video streaming may be divided into one or more modules on the basis of specific operations implemented by various parts of the computer-readable instructions. For example, in FIG. 11, the apparatus 200 for interaction during live video streaming may be divided into an obtaining module 201, a monitoring module 202, a capturing module 203, a recognition module 204, and a display module 205. In the modules:

the obtaining module 201 is configured to obtain streamer-end video data, and user-end video data which is captured in real time by a user terminal, and display the streamer-end video data and the user-end video data as a streamer video and a user video respectively.

Specifically, the computer device is connected to the streamer terminal through a network, and then may obtain a streamer video sent by the streamer terminal. The streamer video is video data captured by the streamer using the streamer terminal during live streaming. Certainly, as a terminal device of a viewing user, the computer device is provided with a camera unit for capturing a user video of the viewing user. That is to say, the obtaining module 201 can obtain the streamer-end video data and the user-end video data, and then display the streamer-end video data and the user-end video data as the streamer video and the user video in a display interface on the computer device 1. In this embodiment, the streamer video and the user video are displayed in one video playback window in a seamless stitching manner and are thus played in a stitching manner, such that the videos of a viewing user and a streamer can be displayed in the same window. As such, the viewing user may feel a sense of being close to the streamer. In other embodiments, the streamer video and the user video may also be displayed separately, which is not limited here.

The monitoring module 202 is configured to monitor and recognize whether the streamer-end video data comprises a preset voice instruction.

After the obtaining module 201 displays the user-end video data and the streamer-end video data in the video playback window, the monitoring module 202 further monitors and recognizes whether the streamer video data comprises a preset voice instruction. In this embodiment, the monitoring module 202 divides audio data in the streamer-end video data into audio data units by means of translational capturing and then sequentially recognizes each of the audio data units to obtain first voice text, and compares the first voice text with a preset voice instruction text library; and the monitoring module determines, when the first voice text comprises a first voice instruction in the voice instruction text library, that the streamer-end video data comprises the first voice instruction.

Specifically, the monitoring module 202 first separates the audio data from the streamer-end video data and then divides the audio data into the audio data units by means of translational capturing according to a timeline. In this embodiment, the translational capturing is sequentially performing division to obtain the audio data segments by time periods, which are used as the smallest unit of voice recognition. Next, the monitoring module 202 sequentially recognizes each of the audio data units to obtain first voice text, and compares the first voice text with a preset voice instruction text library. The voice instruction text library is preset by the computer device and comprises all voice text corresponding to voice instructions that can trigger video special effects. Therefore, the monitoring module 202 compares the first voice text with the voice instruction text library, and when the first voice text comprises a first voice instruction (any valid voice instruction) in the voice instruction text library, the monitoring module determines that the streamer-end video data comprises the first voice instruction.

The capturing module 203 is configured to capture a video data segment within a preset time range from the user-end video data when the streamer-end video data comprises the voice instruction.

The recognition module 204 is configured to determine whether the video data segment comprises target audio and/or a target video, where the target audio and the target video have an association relationship with the voice instruction.

Specifically, when the monitoring module 202 determines that the streamer-end video data comprises the voice instruction, the capturing module 203 finds video data of a corresponding time portion of the user-end video data according to the time point of the streamer-end video data, and then captures the video data segment within the preset time range. In this embodiment, the time range is a preset time period starting from a time point of the streamer-end video data including the voice instruction. In other words, a user returns a feedback after responding to the voice instruction, and then a user end obtains video data of the feedback. Next, the recognition module 204 recognizes the video data segment, and determines whether the video data segment comprises target audio and/or a target video. The target audio and the target video have an association relationship with the voice instruction, and the association relationship is a correlation or a causal relationship. For example, if the voice instruction is "Please cheer for a streamer", the target audio is a shout for cheering for a streamer, or a body movement or facial expression made for cheering for a streamer.

In this embodiment, for the process of determining whether the video data segment comprises target audio, the recognition module 204 first performs voice recognition on audio data in the video data segment to obtain second voice text; and then the second voice text is compared with the first voice text, and when a similarity between the second voice text and the first voice text is higher than a first threshold, the recognition module 204 determines that the video data segment comprises the target audio. For the process of determining whether the video data segment comprises a target video, the recognition module 204 first performs image recognition on video data in the video data segment to obtain a recognition result; and then the recognition result is compared with video recognition data corresponding to the first voice text in a preset voice instruction association list, and when a similarity between the recognition result and the video recognition data is higher than a second threshold, the recognition module 204 determines that the video data segment comprises the target video.

The display module 205 is configured to display a video special effect corresponding to the voice instruction in the user video when the video data segment comprises the target audio and/or the target video.

Specifically, when the recognition module 204 determines that the user video data segment comprises the target audio and/or the target video, the display module 205 searches for a video special effect corresponding to the voice instruction according to the voice instruction, and then displays the video special effect in the user video. Referring to FIG. 6, it is a diagram showing the effect of an exemplary video special effect, in which if the voice instruction is "cheering for a streamer", the display module 205 displays a corresponding video special effect related to cheering for a streamer in the user video, such as displaying the special effect of a cartoon character cheering for a streamer, and highlighting and colorfully displaying the scenario of cheering for a streamer. Further referring to FIG. 7, it is a diagram showing the effect of an exemplary video special effect, in which if the voice instruction is "making a finger heart", the display module 205 displays a corresponding video special effect related to the finger heart in the user video, such as displaying the effect of red hearts rising.

Additionally, the display module 205 also displays a name corresponding to the voice instruction in the user video while displaying the video special effect corresponding to the voice instruction in the user video. As shown in FIG. 8, the voice instruction is "cheering for a streamer", and the video special effect not only shows the effect of a cartoon character cheering for the streamer, but also shows the specific type of cheering for the streamer, namely "Cheer (which means cheering for a streamer by moving a glow stick at a certain rhythm)!". Of course, in other embodiments, when the voice instruction is giving a gift, the display module 205 also displays the reduction of currency in an account of a user by value of the gift while displaying the video special effect corresponding to the voice instruction in the user video.

In another embodiment, the display module 205 is also configured to count a duration of the target audio and/or the target video, and select, according to the duration, a corresponding display level for display of the video with the special effect, where the display level comprises at least one of a display duration and a display pattern.

Specifically, when the video data segment comprises the target audio and/or the target video, the display module 205 displays the video special effect corresponding to the voice instruction in the user video and then also counts the duration of the target audio and/or the target video, and selects, according to the duration, the corresponding display level for display of the video with the special effect. For example, when cheering for a streamer is made, the number of instances of cheering for a streamer, or the level of cheering for a streamer is displayed, or the effect of cheering for a streamer is displayed in a brighter color.

It can be learned from above that the computer device can obtain streamer-end video data, and user-end video data which is captured in real time by a user terminal, and display the streamer-end video data and the user-end video data as a streamer video and a user video respectively; then the computer device can monitor and recognize whether the streamer-end video data comprises a preset voice instruction; when the streamer-end video data comprises the voice instruction, the computer device can capture a video data segment within a preset time range from the user-end video data, and determine whether the video data segment comprises a target audio and/or a target video; and the computer device can display a video special effect corresponding to the voice instruction in the user video when the video data segment comprises the target audio and/or the target video. By means of the above method, a video special effect can be played for a user video according to a result of interaction in voices and/or actions between a streamer and a user, which enriches the way of interaction presentation and enhances the sense of participation in interaction.

The serial numbers of the embodiments of the present application described above are merely for description, and do not indicate that the embodiments are good or bad.

Through the description of the above implementations, those skilled in the art can clearly understand that the methods in the above embodiments can be implemented by software and necessary general hardware platforms. Definitely, the implementations can also be implemented by hardware. However, in many cases, the former implementation is preferred. Based on such understanding, the technical solutions of the present application substantially, or the part(s) thereof making contributions to the prior art, can be embodied in the form of a software product. The computer software product is stored in a storage medium (such as a ROM/RAM, a magnetic disk, or an optical disk), which includes several instructions to enable a terminal device (which may be a mobile phone, a computer, a server, an air conditioner, a network device, etc.) to perform the method described in the embodiments of the present application, the method including:

obtaining streamer-end video data, and user-end video data which is captured in real time by a user terminal, and displaying the streamer-end video data and the user-end video data as a streamer video and a user video respectively; monitoring and recognizing whether the streamer-end video data comprises a preset voice instruction; capturing a video data segment within a preset time range from the user-end video data when the streamer-end video data comprises the voice instruction; determining whether the video data segment comprises target audio and/or a target video, where the target audio and the target video have an association relationship with the voice instruction; and displaying a video special effect corresponding to the voice instruction in the user video when the video data segment comprises the target audio and/or the target video.

The foregoing descriptions are merely illustrative of preferred embodiments of the present application, and are not intended to limit the patent scope of the present application. Any equivalent structure or equivalent process transformation made using the contents of the specification and accompanying drawings of the present application, or any direct or indirect application thereof in other related technical fields shall equally fall within the patent protection scope of the present application.

What is claimed is:

1. A method for live video interaction, comprising:
   obtaining streamer-end video data, and obtaining user-end video data captured in real time by a user terminal;
   displaying a streamer video based on the streamer-end video data, and displaying a user video based on the user-end video data respectively;
   monitoring and recognizing whether the streamer-end video data comprise a preset voice instruction;
   capturing a video data segment within a preset time range from the user-end video data in response to determining that the streamer-end video data comprises the preset voice instruction;
   determining whether the video data segment comprises a target audio or a target video, wherein the target audio and the target video have an association relationship with the preset voice instruction; and
   displaying a video special effect corresponding to the preset voice instruction in the user video response to determining that the video data segment comprises the target audio or the target video.

2. The method of claim 1, wherein the monitoring and recognizing whether the streamer-end video data comprise a preset voice instruction comprises:
   dividing audio data in the streamer-end video data into a plurality of audio data units by translational capturing;
   sequentially recognizing each of the plurality of audio data units to obtain a first voice text, and comparing the first voice text to a preset voice instruction text library; and
   determining that the streamer-end video data comprises the preset voice instruction in response to determining that the first voice text comprises a first instruction in the voice instruction text library.

3. The method of claim 2, wherein the determining whether the video data segment comprises a target audio comprises:
   performing voice recognition on audio data in the video data segment to obtain a second voice text;
   comparing the second voice text with the first voice text; and
   determining that the video data segment comprises the target audio in response to determining that a similarity between the second voice text and the first voice text is higher than a first threshold.

4. The method of claim 2, wherein the determining whether the video data segment comprises a target video comprises:
   performing image recognition on video data in the video data segment to obtain a recognition result;
   comparing the recognition result with video recognition data corresponding to the first voice text in a preset voice instruction association list; and
   determining that the video data segment comprises the target video in response to determining that a similarity between the recognition result and the video recognition data is higher than a second threshold.

5. The method of claim 1, further comprising:
   determining a duration of the target audio or the target video; and
   selecting, based on the duration of the target audio or the target video, a corresponding display level for display of the video special effect, wherein the display level comprises at least one of a display duration and a display pattern associated with displaying the video special effect.

6. The method of claim 1, further comprising:
   displaying a name corresponding to the preset voice instruction in the user video while displaying the video special effect corresponding to the voice instruction in the user video.

7. The method of claim 1, further comprising:
   in response to determining that the preset voice instruction is associated with giving a gift, reducing currency in an account of a user associated with the user terminal based on a value of the gift while displaying the video special effect corresponding to the preset voice instruction in the user video.

8. A computer device, comprising a memory and a processor, wherein the memory stores computer-readable instructions operable on the processor, and wherein the computer-readable instructions, upon being executed by the processor, cause the processor to implement operations comprising:
   obtaining streamer-end video data, and obtaining user-end video data captured in real time by a user terminal;
   displaying a streamer video based on the streamer-end video data, and displaying a user video based on the user-end video data, respectively;
   monitoring and recognizing whether the streamer-end video data comprise a preset voice instruction;
   capturing a video data segment within a preset time range from the user-end video data in response to determining that the streamer-end video data comprises the preset voice instruction;
   determining whether the video data segment comprises a target audio or a target video, wherein the target audio and the target video have an association relationship with the preset voice instruction; and
   displaying a video special effect corresponding to the preset voice instruction in the user video response to determining that the video data segment comprises the target audio or the target video.

9. The computer device of claim 8, wherein the monitoring and recognizing whether the streamer-end video data comprise a preset voice instruction comprises:
   dividing audio data in the streamer-end video data into a plurality of audio data units by translational capturing;

sequentially recognizing each of the plurality of audio data units to obtain a first voice text, and comparing the first voice text to a preset voice instruction text library; and determining that the streamer-end video data comprises the preset voice instruction in response to determining that the first voice text comprises a first instruction in the voice instruction text library.

10. The computer device of claim 9, wherein the determining whether the video data segment comprises a target audio comprises:

performing voice recognition on audio data in the video data segment to obtain a second voice text;

comparing the second voice text with the first voice text; and determining that the video data segment comprises the target audio in response to determining that a similarity between the second voice text and the first voice text is higher than a first threshold.

11. The computer device of claim 9, wherein the determining whether the video data segment comprises a target video comprises:

performing image recognition on video data in the video data segment to obtain a recognition result;

comparing the recognition result with video recognition data corresponding to the first voice text in a preset voice instruction association list; and determining that the video data segment comprises the target video in response to determining that a similarity between the recognition result and the video recognition data is higher than a second threshold.

12. The computer device of claim 8, wherein upon the computer-readable instructions being executed by the processor, the operations further comprise:

determining a duration of the target audio or the target video; and selecting, based on the duration of the target audio or the target video, a corresponding display level for display of the video special effect, wherein the display level comprises at least one of a display duration and a display pattern associated with displaying the video special effect.

13. The computer device of claim 8, wherein upon the computer-readable instructions being executed by the processor, the operations further comprise:

displaying a name corresponding to the preset voice instruction in the user video while displaying the video special effect corresponding to the voice instruction in the user video.

14. The computer device of claim 8, wherein upon the computer-readable instructions being executed by the processor, the operations further comprise:

in response to determining that the preset voice instruction is associated with giving a gift, reducing currency in an account of a user associated with the user terminal based on a value of the gift while displaying the video special effect corresponding to the preset voice instruction in the user video.

15. A non-transitory computer-readable storage medium storing computer-readable instructions, the computer-readable instructions being executed by at least one processor to cause the at least one processor to perform operations comprising:

obtaining streamer-end video data, and obtaining user-end video data captured in real time by a user terminal;

displaying a streamer video based on the streamer-end video data, and displaying a user video based on the user-end video data, respectively;

monitoring and recognizing whether the streamer-end video data comprise a preset voice instruction;

capturing a video data segment within a preset time range from the user-end video data in response to determining that the streamer-end video data comprises the preset voice instruction;

determining whether the video data segment comprises a target audio or a target video, wherein the target audio and the target video have an association relationship with the preset voice instruction; and displaying a video special effect corresponding to the preset voice instruction in the user video response to determining that the video data segment comprises the target audio or the target video.

16. The non-transitory computer-readable storage medium of claim 15, wherein the monitoring and recognizing whether the streamer-end video data comprise a preset voice instruction comprises:

dividing audio data in the streamer-end video data into a plurality of audio data units by translational capturing;

sequentially recognizing each of the plurality of audio data units to obtain a first voice text, and comparing the first voice text to a preset voice instruction text library; and determining that the streamer-end video data comprises the preset voice instruction in response to determining that the first voice text comprises a first instruction in the voice instruction text library.

17. The non-transitory computer-readable storage medium of claim 16, wherein the determining whether the video data segment comprises a target audio comprises:

performing voice recognition on audio data in the video data segment to obtain a second voice text;

comparing the second voice text with the first voice text; and determining that the video data segment comprises the target audio in response to determining that a similarity between the second voice text and the first voice text is higher than a first threshold.

18. The non-transitory computer-readable storage medium of claim 16, wherein the determining whether the video data segment comprises a target video comprises:

performing image recognition on video data in the video data segment to obtain a recognition result;

comparing the recognition result with video recognition data corresponding to the first voice text in a preset voice instruction association list; and determining that the video data segment comprises the target video in response to determining that a similarity between the recognition result and the video recognition data is higher than a second threshold.

19. The non-transitory computer-readable storage medium of claim 15, wherein the computer-readable instructions are executed by the processor to cause the at least one processor to further perform operations comprising:

determining a duration of the target audio or the target video, and selecting, based on the duration of the target audio or the target video, a corresponding display level for display of the video special effect, wherein the display level comprises at least one of a display duration and a display pattern associated with displaying the video special effect; or displaying a name corresponding to the preset voice instruction in the user video while displaying the video special effect corresponding to the voice instruction in the user video; or in response to determining that the preset voice instruction is associated with giving a gift, reducing currency in an account of a user associated with the user terminal based on a value of the gift while displaying the video special effect corresponding to the preset voice instruction in the user video.

\* \* \* \* \*